United States Patent
Lohier et al.

(10) Patent No.: US 8,451,910 B1
(45) Date of Patent: May 28, 2013

(54) WIRELESS MULTIMEDIA DEVICE WITH REAL TIME ADJUSTMENT OF PACKET RETRY FUNCTION AND BIT RATE MODULATION

(75) Inventors: Frantz Lohier, El Cerrito, CA (US); Joachim Nüesch, Zürich (CH)

(73) Assignee: Logitech Europe S.A., Morges (CH)

( * ) Notice: Subject to any disclaimer, the term of this patent is extended or adjusted under 35 U.S.C. 154(b) by 1906 days.

(21) Appl. No.: 11/567,060

(22) Filed: Dec. 5, 2006

Related U.S. Application Data

(60) Provisional application No. 60/830,428, filed on Jul. 13, 2006.

(51) Int. Cl.
*H04N 11/02* (2006.01)

(52) U.S. Cl.
USPC .............................. 375/240.28; 375/240.27

(58) Field of Classification Search
USPC ........................ 375/240.27, 240.28
See application file for complete search history.

(56) References Cited

U.S. PATENT DOCUMENTS

| | | | |
|---|---|---|---|
| 4,284,976 A * | 8/1981 | Gable et al. | 370/355 |
| 5,557,663 A * | 9/1996 | Huang et al. | 379/110.01 |
| 6,233,017 B1 * | 5/2001 | Chaddha | 375/240.12 |
| 7,355,976 B2 * | 4/2008 | Ho et al. | 370/235 |
| 2004/0148423 A1 * | 7/2004 | Key et al. | 709/235 |
| 2005/0008074 A1 * | 1/2005 | van Beek et al. | 375/240.01 |
| 2005/0060752 A1 * | 3/2005 | Pendakur et al. | 725/93 |
| 2005/0140787 A1 * | 6/2005 | Kaplinsky | 348/207.1 |
| 2006/0222110 A1 * | 10/2006 | Kuhtz | 375/334 |
| 2006/0274830 A1 * | 12/2006 | Koto | 375/240.03 |

OTHER PUBLICATIONS

"iCAMView—Web Server for USB Camera"; http://www.icamview.com, 3 pages, May 24, 2007.
"Keep an Eye on Your Home, Anytime . . . Anywhere . . . The First Easy-to-Install Internet Camera in the Market";http://us.creative.com/products/product.asp?category=218&subcategory=601&product=14 . . . , 3 pages, May 24, 2007.

\* cited by examiner

*Primary Examiner* — Sath V Perungavoor
*Assistant Examiner* — Jeffery Williams
(74) *Attorney, Agent, or Firm* — Kilpatrick Townsend & Stockton LLP

(57) ABSTRACT

A method and apparatus for real time adjustment of wireless transmission in a media device (e.g., webcam), as opposed to a server or computer. In one embodiment, the adjustment, or dynamic tuning, involves tracking available bandwidth of the radio signaling rate and varying one of the retry rate, compression and frame rate. Also, the adjustment can be made on the basis of forecasts based on past behavior. A tracking and control algorithm is used to modulate the video bit-rate from the camera with the dynamic bit-rate available in a WiFi link.

18 Claims, 5 Drawing Sheets

Retry Header (a) Camera to USB client-to-client bridge (b) USB client-to-client bridge to WiFi radio (c) over WiFi Retry Header

WIRELESS MULTIMEDIA DEVICE WITH REAL TIME ADJUSTMENT OF PACKET RETRY FUNCTION AND BIT RATE MODULATION

CROSS-REFERENCES TO RELATED APPLICATIONS

This application claims priority from provisional application No. 60/830,428, entitled "Video Over Wireless", filed on Jul. 13, 2006, which is incorporated herein in its entirety.

BACKGROUND OF THE INVENTION

The present invention relates to wireless transmission of media data, and in particular to real time adjustment of transmissions from a wireless webcam which maps the USB protocol over WiFi (802.11 protocol).

Video and audio communications provide some unique challenges in wireless communications. Unlike some other control or data signals, such as those transmitted by mice, keyboards, etc., audio data has strong periodic timing requirements while video data requires large bandwidth. For instance, 30 frames per second of video is often needed in order to preserve required quality.

Many common network protocols in use today are asynchronous and packet based. One of the most popular is Ethernet or IEEE 802.3 which is a wired networking protocol. This type of network is optimized for bursts of packetized information with dynamic bandwidth requirements that can be settled on-demand. This type of network works well for many data intensive applications in computer networks but is not ideal for situations requiring consistent delivery of time-critical data over an error-prone channel such as the air. Wireless communications often use buffers to store data such that it can be retransmitted if the wireless channel prevents its successful transmission. Retrying failed packets make it difficult to deal with isochronous data, in particular real-time streaming of synchronized audio and video data where strict latency is required.

Such video and audio data is commonly transmitted in various communications such as Video Instant Messaging, video conferencing, and so on. When data is transmitted wirelessly, in order to prevent packets from being dropped, a packet retry rate is established. The packet retry rate typically provides the maximum number of times the system retries to send a packet until it is successfully transmitted. If the retry rate is exceeded and the packet is still not transmitted successfully, the system does not try to send the packet through anymore, and the packet is dropped.

A Cerfified wireless USB (CWUSB) promoter group was formed in 2004 to define a WUSB specification. The specification sets forth a hub and spoke model, with a host controller initiating data transfers. Like wired USB, each transfer consists of 3 packets, token, data and handshake. In CWUSB, multiple token information is combined in a single packet. For isochronous transfers (e.g., streaming audio, video), bandwidth is reserved for a certain number of retries each service period and CWUSB peripherals embed enough internal buffers to allow for the max retry count.

There can be quality tradeoffs for bandwidth in USB connections. Logitech U.S. Pat. No. 6,618,776 adjusting to available bandwidth over USB by a number of mechanisms, such as varying the video frame rate, resolution, compression, etc. US Published Patent Application No. 2006/0193380 of VIXS describes managed degradation of a video stream, such as by varying compression or resolution. This management is done with a state machine in a server, which monitors the network bandwidth.

BRIEF SUMMARY OF THE INVENTION

The present invention provides a method and apparatus for real time adjustment of wireless transmission in a media device (e.g., webcam), as opposed to a server or computer. In one embodiment, the adjustment, or dynamic tuning, involves tracking available bandwidth of the radio signaling rate and varying one of the retry rate, compression and frame rate. Also, the adjustment can be made on the basis of forecasts based on past behavior. A tracking and control algorithm is used to modulate the video bit-rate from the camera with the dynamic bit-rate available in a WiFi link.

In one embodiment, the retry rate is varied based on measured quality of service features. The number of retries is set forth in an additional header. The header provides a way of setting a different packet retry rate (PER) on a packet-by-packet basis.

The retry rate can be varied based on the type of data, such as using more retries for audio than for video. In a video and audio conversation (e.g., Video IM), often it is more important to get more of the audio data across, while some video data being dropped may be acceptable. In accordance with some embodiments of the present invention, a link is established, and then queues are allocated, with each queue having a level of priority. Thus, it is possible to give higher priority to audio, and lower priority to the video stream, in a video and audio conversation.

In one embodiment, the wireless transmission is done using the WiFi standard. The WiFi standard specifies that the output power and bit rate can be regulated. These parameters can be monitored to determine the appropriate number of retries.

DETAILED DESCRIPTION OF THE INVENTION

Overall System

Figure 1:
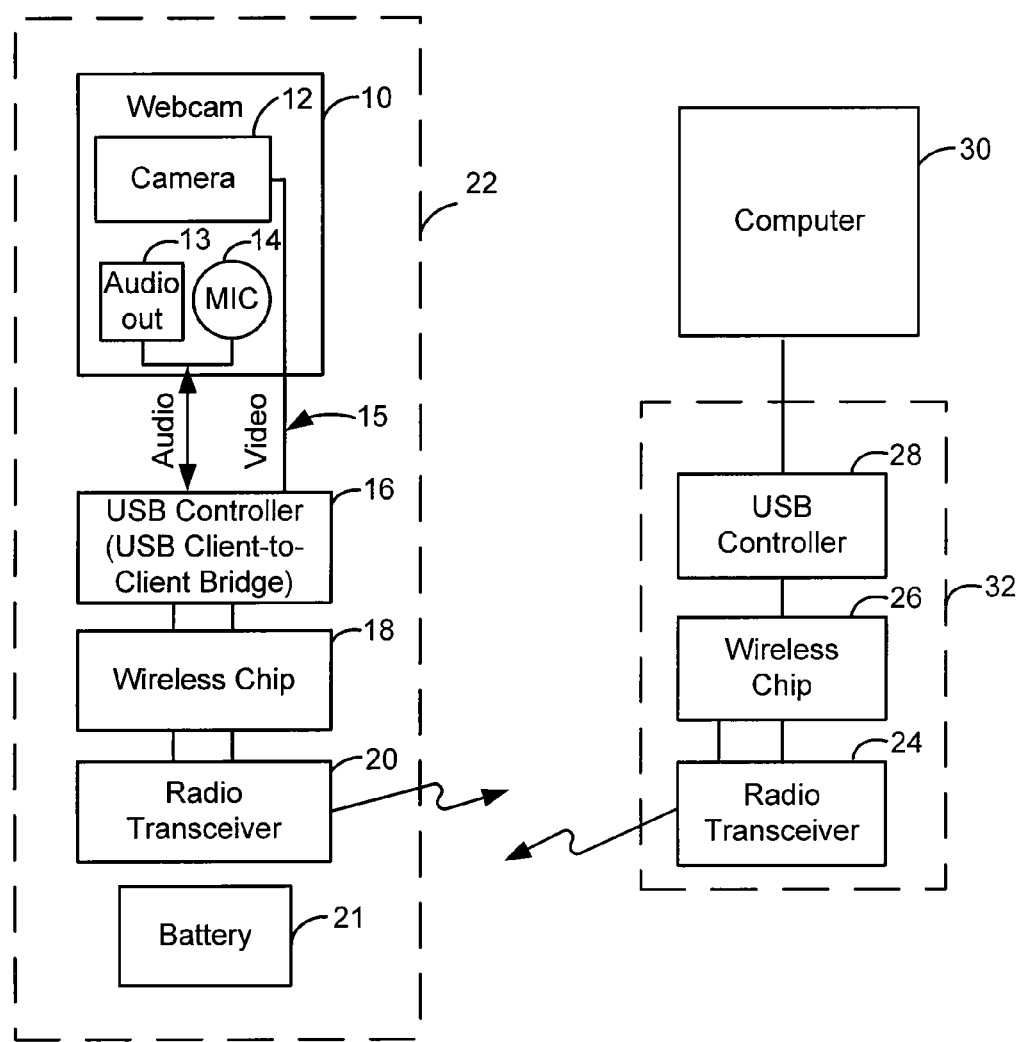
FIG. 1 is a block diagram of an embodiment of a system incorporating the present invention.

FIG. 1 is a block diagram of an embodiment of a system incorporating the present invention. A media device, webcam 10, includes a camera 12 and microphone 14 and 14' a audio out capability. Audio and video are provided to a USB controller 16, such as the Cypress EZ-Host processor. Controller 16 in turn is connected to a wireless controller 18, which is then connected to a radio transceiver 20. All of these elements may be integrated into a single housing 22, and are powered by a battery 21.

Wireless transmission occurs between radio transceiver 20 and a radio transceiver 24. Radio transceiver 24 is connected to a different wireless controller 26, which connects to a USB controller or interface 28, which connects to a USB port of a computer 30. Elements 24-30 may be integrated into a USB dongle 32.

In operation, wireless chip 18 monitors the signaling rate, bandwidth and quality of service (QoS) aspects of the wireless transmission. This information is provided to USB controller 16, which can vary the frame rate, compression or retry rate appropriately.

Retry Header

Figure 2:
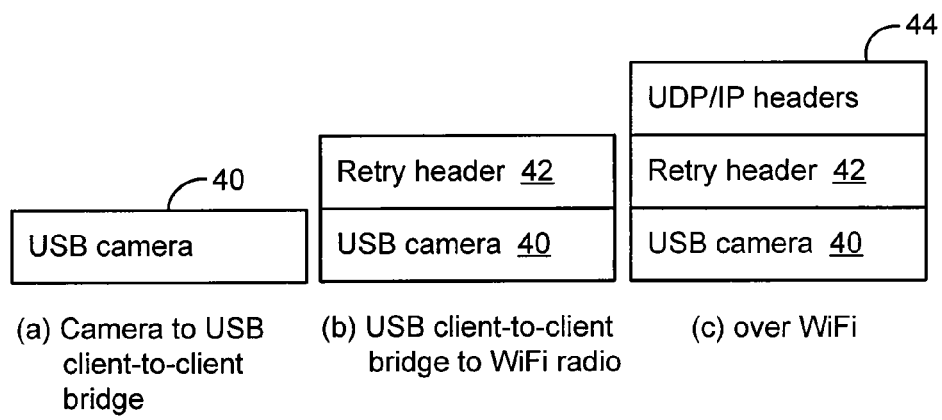
FIG. 2 is a diagram at a high level the transmission fields used in an embodiment of the invention.

FIG. 2 illustrates at a high level the transmission fields used in an embodiment of the invention. Data from the camera is in a first field 40, sent from the camera to the USB controller. The USB controller adds a retry header 42, and forwards the data to the wireless controller. The wireless controller optionally adds the UDP/IP headers 44 for wireless transmission.

Figure 3:
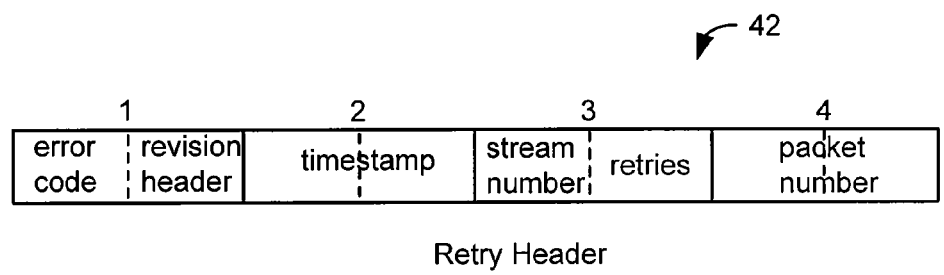
FIG. 3 is a diagram of the retry header of FIG. 2.

FIG. 3 is a diagram of the retry header of FIG. 2. Four bytes are used. Byte 1 includes an error code and revision header. Byte 2 is a timestamp. Byte 3 has both the stream number and the retry number. The stream number is the USB endpoint number from the camera. The retry number specifies the maximum number of wireless transmission retries for this packet. Byte 4 is the packet number.

Forecasting

Figure 4:
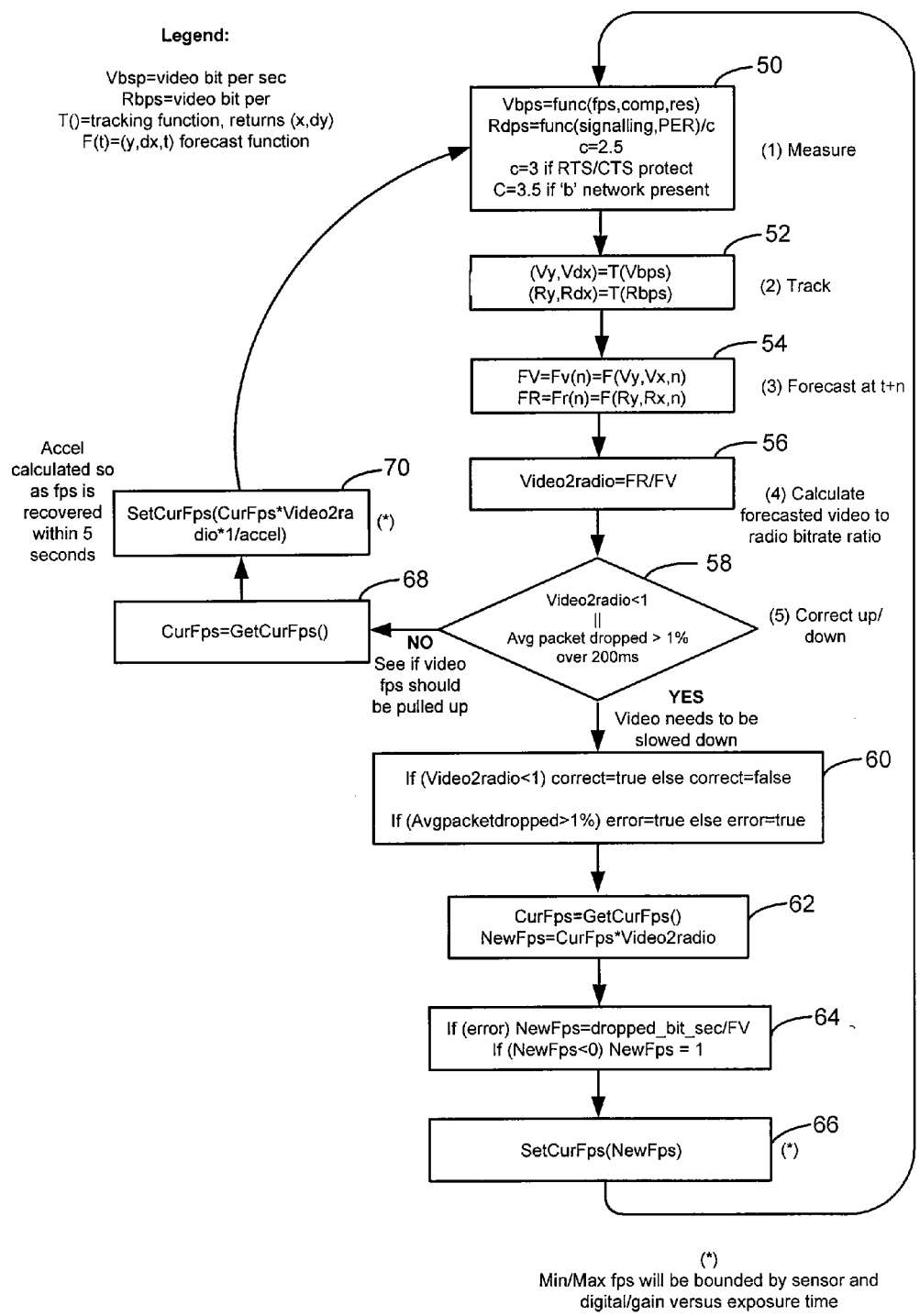
FIG. 4 is a flow chart illustrating varying a transmission aspect based on forecasting according to a first embodiment of the invention.

FIG. 4 is a flow chart illustrating varying a transmission aspect based on forecasting according to an embodiment of the invention. In one embodiment, the adjustment, or dynamic tuning, involves tracking available bandwidth or the signaling rate and varying one of the retry rate, compression and frame rate. This example shows tracking the video, but audio could also be tracked in a similar manner.

In a first step 54, parameters are measured. "Vbps" is the video coming from the camera, in bits per second. "Rbps" is the video going out, and reflects effective throughput. The constant "c" is intelligence put into the device—the camera will look at the environment and assess what "c" should be. The "c" constant is the ratio between the theoretical bandwidth offered by the radio as opposed to the effective bandwidth that can be sent by the camera. In the second step 56, the measurements of the first step are tracked over time. Based on this tracking, a forecasting estimate is generated in step 54. In step 56, a calculation is done of the ratio of the forecasted video bit rate to the actual video bit rate. The goal is to get VBR/RBR=1

If the ratio is less than 1 (step 58), and the average number of dropped packets is greater than 1%, the video needs to be slowed down. The error and correction states are set (step 60), and the current frames per second (CURFps) are set to a new value, of the current value times the ratio. If the error state was set to true (>1% dropped packets), then the new rate of frames per second is adjusted (step 64), and the current frames per second is reset (step 66).

If the answer to the test in step 58 is no, the video frames per second (FPS) can be increased. The current frames per second is set to a new value (step 68), which is set to increase at an acceleration (accel) rate that yields the desired fps in 5 seconds (step 70).

Changes in bandwidth could be based upon various factors. For example, a linear change in available bandwidth may be caused by someone walking away, while a bursty/quick change in available bandwidth may be caused by the user putting on a BT headset.

USB Controller, Wireless Chip Interaction

In addition to implementing a USB host-to-host bridge, the USB controller (USB controller) formats and redirects the traffic from the camera to the wireless chip. USB packets from the camera are sent over the wireless chip's bulk endpoints. The mapping is done thanks to an additional header described below. The wireless chip encapsulates the header and the camera USB payload in UDP packets and sends them over the wireless link.

Since UDP are not acknowledged at the protocol level, only the acknowledgement at the 802.11 MAC level is here to ensure the retransmission in case of failure.

Figure 5:
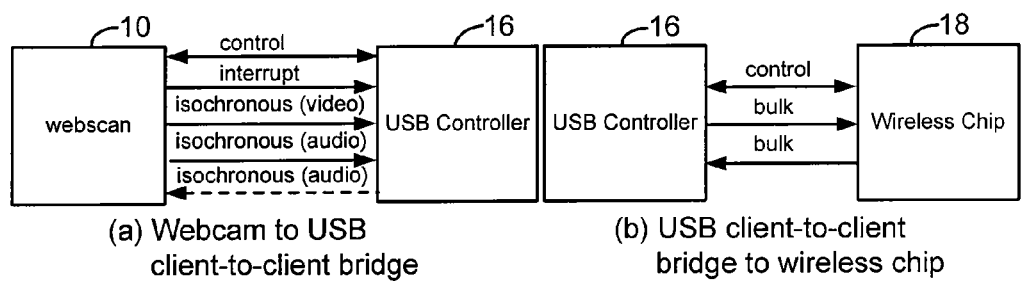
FIG. 5 is a diagram of the data and control flow between the webcam (camera), USB controller and wireless chip in one embodiment.

FIG. 5 shows the data and control flow between the webcam (camera), USB controller and wireless chip in one embodiment. There are four USB pipes between the camera and the USB controller. Between the camera and the USB controller two isochronous endpoints are used for audio and video. An interrupt endpoint is used as backchannel for the camera to the PC. For configuration purposes a bidirectional control endpoint is also exposed by the camera.

From the webcam standpoint the main change between corded and cordless mode is the variable nature of the available bandwidth in cordless mode. To accommodate this, the USB controller instructs the camera to modulate its video frame rate and image compression level based on the RF link performance. In another implementation, the USB controller parses the video streams and decides to skip a given amount of frame to reduce the video traffic with the camera intervention. So in addition to the settings given from the PC, the USB controller will make further adjustments. These adjustments are based on RF link quality information that the USB controller receives from the wireless chip. This information as well as administrative commands such as the creation of the RF link, are also sent over the wireless chip's bulk endpoint.

The wireless chip and radio transceiver are optimized for low power mobile devices. The wireless chip is a SoC (System on a Chip) with an ARM9 low power processor. This solution can work under either 802.11g or 802.11a. To increase the wireless link quality diversity antenna switching is supported. When two antennas are placed far enough from each other or in different polarization then this diversity can help improving the connection.

The ARM9 processor is used to combine several USB packets to a bigger 802.11 frames before sending the information over the air. The overhead in 802.11 is much bigger so the efficiency increases with larger packets.

The USB controller (E.g., Cypress EZ-Host—CYC67300) is used as host-to-host bridge. It only works in USB FS. So the USB connection actually offers less bandwidth than the effective one offered by the wireless chip.

The Cypress chip has a 16-bit RISC processor which can be clocked at up to 48 MHz. This processor has two main tasks. First, it bridges the USB packet from and to the camera over to the wireless chip. Second, it configures the camera and the WiFi dongle. The Cypress chip currently enumerates and configures the webcam. In a later stage the PC will configure the webcam via a backchannel.

The USB controller has two independent USB host ports. On both sides the full USB bandwidth in FS is available. The chip has 16 kB internal RAM used for data and instructions.

Programming

The code run by the USB controller is interrupt driven for the different USB subtransactions. If no interrupt service routine is running, the core sits in an idle loop. All interrupt service routines are kept short to avoid blocking the processor. Any time consuming task is deferred to the idle loop.

Webcam

The webcam can be an adapted standard wired USB webcam from Logitech. In order to change the video data rate generated by the webcam, an on-the-fly command to alter frame rate/quality is added to the firmware.

Settings used by the camera are the default ones, only the resolution, frame rate, and the quality are set. QVGA (320×240) setting at 30 fps with the best quality is chosen. The cameras used had at least a VGA sensor (640×480). Since the throughput of video from the camera to the USB controller is limited to 5.1 Mbit/s, resolutions up to VGA at 15 frames per second can be achieved in one embodiment.

The audio stream in one embodiment is unidirectional from the camera to the PC. The audio is uncompressed pulse code modulation (PCM) with 16 kHz and 16 bit. This gives a data rate of 256 kbit/s.

Quality of Service

The camera's A/V data streaming is optimized by varying the camera settings based on the RF link performance. When possible, one embodiment also proactively optimizes the settings of the WiFi radio transceiver (e.g. by controlling the output power). On the PC/receiver side, QoS is also implemented by techniques such as packet loss concealment.

Camera

Of all the Webcam settings, only the settings which allow one to modulate the data rate, to react on the performance of the wireless link, are used. This includes the resolution, the compression, and the frame rate.

Resolution

The available resolutions depend on the sensor used by the camera. Today's throughput of the USB FS connection limits the video data rate, so the largest supported resolution is VGA (640×480).

Compression

The video stream of the camera is compressed using MJPEG. To modulate the compression level, the multiplication factor of the MJPEG quantization matrix (Q factor) can be changed on the fly. This factor can be changed on a macroblock basis. This gives the opportunity to react quickly to changes in the RF bandwidth.

When the compressed data rate becomes larger than the USB FS bandwidth, the internal buffer of the webcam will overflow. The camera communicates this by an error flag in the USB video class (UVC) header and the Bus controller can react to this. This can happen as the MJPEG data rate is dependent on the content of the image.

Q-Factor Change

In one embodiment of the firmware of the webcam ASIC, there is a index i associated with the Q factor. This index helps estimate the change in the data rate as a function of the index change $\Delta i$. The formula used to fit the data is $$BW = a \cdot \exp(b \cdot i) + c \quad (4.1)$$

From this equation the relative step $\Delta i$ becomes $$\frac{BW(i) - c}{BW(i + \Delta i) - c} = \frac{a \cdot \exp(b \cdot i)}{a \cdot \exp(b \cdot (i + 1))} = \exp(-b \cdot \Delta i) \quad (4.2)$$

The statistical fit done with R [29] considering the different data gives an average of b=0.19. A second fit with fixed b=0.2 is made, so the equation becomes $$BW = a \cdot \exp(0.2 \cdot i) + c \quad (4.3)$$

The combination of [4.3] in [4.2] gives $$\frac{BW(i) - c}{BW(i + \Delta i) - c} = \exp(-0.2 \cdot \Delta i) \quad (4.4)$$

The average for c in this curve fitting exercise is c=0.77 MB/s. This makes it possible to estimate the necessary step of index i of the Q-factor as a function of the desired bandwidth.

Frame Rate

The frame rate is directly proportional to the data rate plus a offset. This offset comes from the UVC header. The header has the size of 12 B for each isochronous packet (1 ms). This gives a overhead data rate of 12 B/ms=96 kbit/s for the UVC header.

Changing the frame rate dynamically in one embodiment is synchronized with the acquisition's start of a new sensor's frame. At 10 fps this can take up to 100 ms. The reaction time to change the frame rate will be longer than for the compression. So adjusting the frame rate is better for long term adjustments.

Wireless Chip Controls

In the wireless chip there are some radio related parameters (signaling rate, power, and numbers of retries) and some parameters made available as an extension of the native wireless chip WiFi firmware (queue size, priority).

Signaling Rate

The signaling rate of the radio transceiver is dependent on the packet error rate (PER). If the PER becomes too high the signaling rate will decrease and increase if the PER is good. Additionally the retried packet can be transmitted at slower signaling rate. Modulating the radio modulation scheme increases the chance of a successful transmission.

Power

The output power of the wireless radio is between 6 dBm and 17 dBm for the WiFi standard. The power can be fixed or be dependent of the signaling rate. In one embodiment, the power is dependent on the signaling rate then the power increases with decreasing signaling rate.

Retries

Retries are specified on a packet basis in the Logitech header (see FIG. 3.3). For the control and interrupt endpoint, retries are infinitely happening.

The use of this parameter is of limited benefit. In the current design a single lost video packet corrupts a complete frame. Because of this the retries are fixed to the maximal number which is 8 for the current radio.

When it is possible to resynchronize in the MJPEG stream the control over the retries could give a interesting possibility for a trade-off between packet loss and power consumption. In the current design the packet loss have to much impact that this would be interesting.

Queue Size

In the wireless chip WiFi chip, four queues are allocated by the USB controller for the different USB endpoints of the camera. These queues can have different sizes (see table 4.1). This queues represent the only buffers on the wireless subsystem of one embodiment.

TABLE 1

| queue name | queue size |
|---|---|
| video queue | 12.9 kB |
| audio queue | 1.3 kB |
| control queue | 2 kB |
| interrupt queue | 2 kB |

As shown in table 1, the queue size for the video is defined in a packet so the queue size is 9.1470 B=12.9 kB for a maximum packet size of 1470 B. For the audio the same is true as for video, but there are two packets. The size is 2.684

B=1368 B as the size of a 20 ms packet is 684 B. The control and interrupt packet don't have defined size, so a minimal buffer segment is allocated.

In the worst case a packet of 640 B of video arrives every 1 ms. In this case two of those USB packets (representing compressed video) are packed into an UDP packet. The maximum buffered time would be 18 ms for video data. On the audio side the buffer time is 2.20 ms=40 ms.

Priority

Queues have different priorities. When there are data to send, the WiFi firmware takes the data with the highest priority queue. Once the data is passed to the radio, the radio tries until the retry count is zero. The priority is the highest for control transfers, followed by interrupt, audio and at the end the video transfer.

Software

The PC software that receives the USB streams from the WiFi radio implements A/V QoS. This is done by packet loss concealment techniques.

G.711

For audio, packet loss concealment planned is implement similarly to annex 1 of G.711. This algorithm only works on the receiving side, so there is no need to change the encoder for the algorithm. The only constraint is the length of the audio packet. In order to function, the packet length over time shouldn't be too large. In one embodiment, audio packets are fixed to 20 ms.

MJPEG

In one embodiment, there is support for packet loss concealment on the video stream. There is resynchronization with the MJPEG stream when a packet is lost. In another embodiment, synchronization is only done at the starts of a frame.

Control Algorithm

The goal of the control algorithm is the optimization of the video bit rate in order to match the variable wireless bandwidth. If the wireless link doesn't have enough bandwidth, the webcam settings need to be adapted. Beside the adaption of the webcam's frame rate and compression level, the user should be informed on the performance of the RF link. This allows the user to change the camera location.

Figure 6:
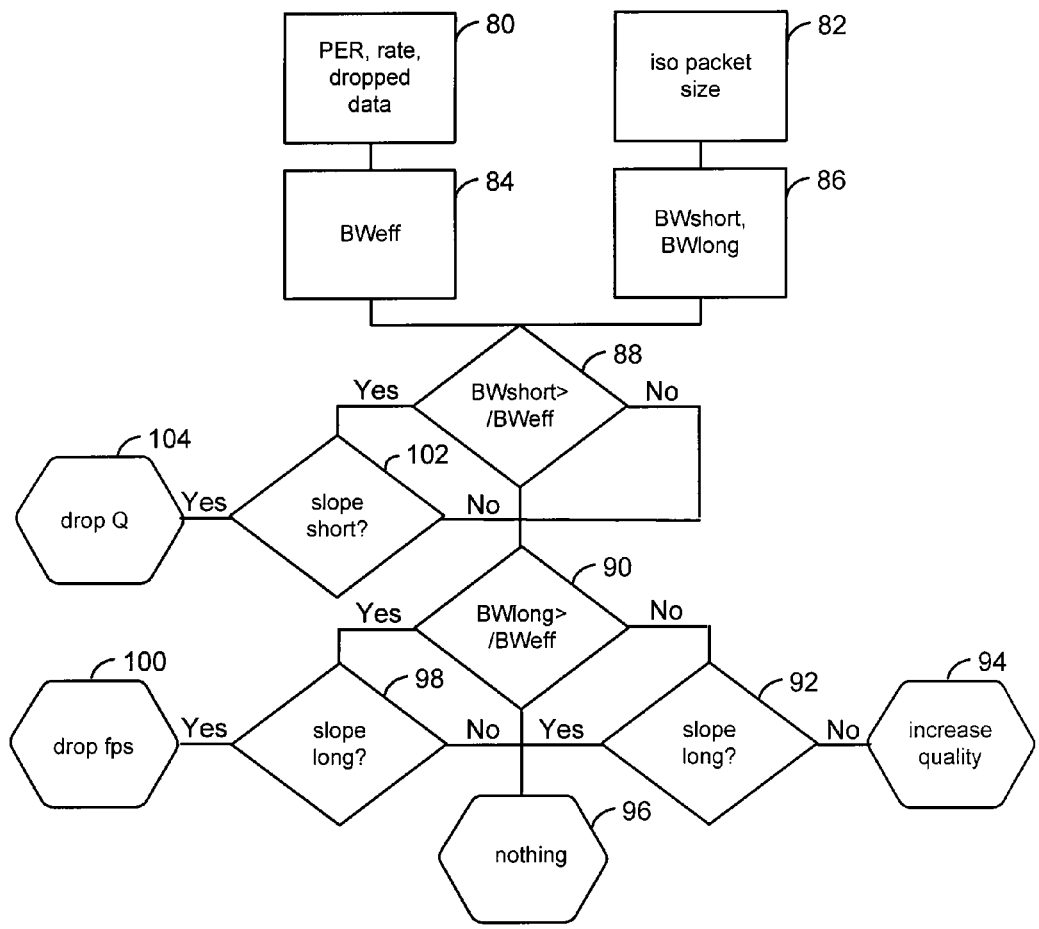
FIG. 6 is a flowchart of a second embodiment of the rate matching control algorithm.

A flowchart of a second embodiment of the rate matching control algorithm is shown in FIG. 6 (FIG. 4 shows another embodiment). There are four inputs, with 3 shown in block 80 and one in block 82. Block 80 includes as inputs PER, the signaling rate and the amount of dropped data. Block 82 includes the isochronous packet size input.

The control algorithm is divided into three parts. Two parts are used to calculate bandwidth; one calculates the actual video data throughput and the other forecasts the possible throughput over the wireless link. The third part combines both calculations and reacts to adjust the camera settings. This real-time control algorithm is implemented on the USB controller.

In step 84, the effective bandwidth (BWeff) is calculated from the three inputs of PER, the signaling rate and the amount of dropped data. In step 86, the estimated short term bandwidth (BWshort) needed for isochronous video packets is calculated, along with the long term bandwidth estimate (BWlong). The short term and long term estimates are compared to the current effective bandwidth (steps 88, 90).

The input is the effective size of the isochronous video packet. To reduce the calculation load this data is preliminarily averaged. In case of the short term estimation the time of averaging is 32 ms, for the long term 512 ms. If the slope of the short term ratio is steep (slope short), meaning that the short term estimate is much greater than the current bandwidth (step 102), then the quality (Q) is dropped (step 104). If the short term estimate is not greater (step 88, no) but the long term estimate is much greater than the current bandwidth (step 98), then the frames per second is dropped (step 100). If the short term estimate is not greater (step 88, no) and the long term estimate is not greater (step 90, no; step 92, no), than the current bandwidth, the quality is increased (step 94).

Averaging of the Video Data Rate

The average of the video data rate is calculated with a discounted least-squares fit. This fit has several interesting features. One is that it exists a recursive form to calculate the fit and this reduces the calculation effort.

Discounted Least-Squares Fit

The discounted least-squares fit is based on a g-h tracking filter. The equation determines the estimation $x^*_{n+1,n}$ in the time frame (n+1) based on the knowledge at the time n and its derivation $\dot{x}^*_{n+1,n}$. The two parameters $h_n, g_n$ are the weight of consideration of the error between the last estimation $x^*_{n,n-1}$, and the measure $y_n$.

$$x^*_{n+1,n} = x^*_{n,n-1} + \frac{h_n}{T}(y_n = x^*_{n,n-1}) \qquad (4.5a)$$

$$x^*_{n+1,n} = x^*_{n,n-1} + T\dot{x}^*_{n+1,n} + g_n(y_n = x^*_{n,n-1}) \qquad (4.5b)$$

The idea of the discounted least-squares fit is to minimize the square of the weighted error e. The older the data becomes the less it is weighted.

$$e = \sum_{r=0}^{N} \theta^r \epsilon^2_{n=r} \qquad (4.6)$$

The weight actually decreases when θ fulfill the following condition $$0 \leq \theta \leq 1 \qquad (4.7)$$

This error function can be obtained by a g-h tracking filter when the parameter g,h are chosen as the followed $$g = 1 - \theta^2 \qquad (4.8a)$$

$$h = (1 - \theta^2) \qquad (4.8b)$$

Tracking the Webcam's Video Throughput

For the calculation of the video throughput the discounted least-squares fit is used. The input is the effective size of the isochronous video packet. To reduce the calculation load this data is preliminarily averaged. In case of the short term estimation the time of averaging is 32 ms, for the long term 512 ms.

The summation of the packet size is done in an interrupt service routine. The rest (average and discounted least-square fit) are done in the idle loop. The time isn't considered in the algorithm but the assumption is made that each millisecond an isochronous packet arrives.

The timing of the short term fit is limited by the way data is transmitted by the webcam. The data throughput oscillates within frames. The length of the averaging and the parameter g and h are chosen to smooth out this oscillation and to have a stable result in the short term calculation.

Estimation of the Effective Wireless Throughput Using the Bit Error Rate

Several parameters can be used to characterize the wireless link. The most obvious one is the signal to noise ratio (SNR). But this value is calculated from the received signal strength indicator (RSSI) and the noise floor (NF). These parameters don't necessary translate into an effective bit-rate. Because of this, one embodiment usea the bit error rate (BER), the current signaling rate and the number of lost bits. The lost bits are the data dropped by the WiFi dongle when the video queue gets full.

Measurements of the Rf Performance

Measurements were made with two laptops and two dongles. To generate the traffic and measure the throughput, Iperf was used. To measure the PER and the signaling rate a 802.11 sniffer (Airopeek) from WildPackets Inc. was used.

The data leads to an empiric function for the effective bandwidth $$BW_{eff} = \frac{-1330}{\text{rate}} \cdot PER + 20$$

This result may not be sufficiently accurate for some applications because the number of the lost packets (after retries) was not taken into consideration.

Estimation of the Effective Wireless Bandwidth

In the current implementation we make the assumption that the effective throughput should be a function of the bit error rate (BER) and the signaling rate. The idea is to multiply the signaling rate with the BER. To consider the overhead of 802.11, there is an additional factor c introduced.

$$BW_{eff} = \frac{\text{rate} \cdot BER}{c}$$

From the data from the measurements made, it follows that not the whole range in BER can be used. So the BER range from 25% to 100% is mapped into 0% to 100%. The signaling rate is converted from Mbit/s to kbit/s So the equation used in the algorithm is $$BW_{eff} = \text{rate} \cdot (BER - 25) \cdot \frac{1000}{75 \cdot 2.6} \approx \text{rate} \cdot (BER - 25) \cdot 5$$

with c=2.6. c is chosen to get a integer number of the final factor for calculation reasons. The amount of data dropped in the WiFi dongle is given each 10 ms. The dropped data is expressed as a multiple of 100 bit, so the conversion is $$\frac{100 \text{ bit}}{10 \text{ ms}} = \frac{10 \text{ kbit}}{s} = 10 \cdot \text{kbit/s}$$

The factor 10 is increased to 15 to give the dropped data more weight.

With this equation each 10 ms the bandwidth is calculated. This bandwidth is averaged with a discounted-least square fit. Error burst are more important than constant good condition. To take this into account the g and h parameter are different for the two directions. The fit converges faster when the bandwidth decreases compared to when it increases.

At the end the ratio between the two bandwidths is calculated. As the precision of the calculation is less important, the bandwidth of the video data (denominator) is shifted by 8 bits.

Reaction

To design the reaction part of the algorithm, the timing of the webcam has to be known. If the algorithm works faster than the ability of the webcam to react, an unstable control loop would be built.

To estimate the steps necessary for the compression change the data from the measurements can be used. For the frame rate the absolute position needs to be known as the function is linear and not exponential.

User Notification

The user should be informed of the quality of the wireless link. The RSSI doesn't reflect the distance precisely, but it is a good estimation.

It will be understood that modifications and variations may be effected without departing from the scope of the novel concepts of the present invention. For example, an RF link other than WiFi could be used, such as CWUSB or BlueTooth. Transmissions could be made according to 802.11n combined with scalable audio/video compression techniques. Alternately, the calculations could be done in the computer, with the results transmitted to the media device. Accordingly, the foregoing description is intended to be illustrative, but not limiting, of the scope of the invention which is set forth in the following claims.

What is claimed is:

1. A method for real time adjustment of wireless transmission, comprising:
   tracking an aspect of available wireless bandwidth in a media device;
   varying, in response to said tracked aspect, one of the retry rate, compression and frame rate in said media device;
   providing a retry header for transmission packets, said retry header setting forth a maximum number of retries for said transmission packet; and
   varying said maximum number of retries between at least two headers based on said tracking an aspect of available wireless bandwidth,
   wherein, said media device is a webcam.

2. The method of claim 1 further comprising:
   forecasting a future value of said aspect based in part on past behavior of said wireless transmission;
   varying, in response to said forecasting, one of the retry rate, compression and frame rate in said media device.

3. The method of claim 1 wherein the number of retries is varied depending upon the type of data.

4. The method of claim 1 wherein said maximum number of retries is set differently for video packets than for audio packets.

5. The method of claim 1 wherein the maximum number of retries is higher for audio than for video.

6. The method of claim 1 wherein the retry rate is varied based on measured quality of service features.

7. The method of claim 1 further comprising tracking an output power and bit rate of said media device to determine the appropriate number of retries.

8. An apparatus for real time adjustment of wireless transmission, comprising:
   a controller configured to track an aspect of available wireless bandwidth in a media device;
   a wireless chip configured to generate a wireless protocol;
   a transmitter, coupled to said wireless chip, for wirelessly transmitting a signal from said media device in accordance with said wireless protocol;
   wherein said media device is a webcam and said controller is configured to vary, in response to said tracked aspect, one of the retry rate, compression and frame rate in said media device,
   wherein said controller is further configured to provide a retry header for transmission packets, said retry header setting forth a maximum number of retries for said transmission packet, and said controller is further configured to vary said maximum number of retries between at least two headers based on said tracking an aspect of available wireless bandwidth.

9. The apparatus of claim 8, wherein said webcam includes separate audio and video outputs.

10. The apparatus of claim 8 wherein said controller is configured to forecast a future value of said aspect based in part on past behavior of said wireless transmission, and vary, in response to said forecasting, one of the retry rate, compression and frame rate in said media device.

11. The apparatus of claim 8 wherein the number of retries is varied depending upon the type of data.

12. The apparatus of claim 11 wherein said maximum number of retries is set differently for video packets than for audio packets.

13. The apparatus of claim 11 wherein the maximum number of retries is higher for audio than for video.

14. The apparatus of claim 11 wherein the retry rate is varied based on measured quality of service features.

15. The method of claim 1, wherein the frame rate of the webcam is varied in said webcam in response to said tracked aspect.

16. The method of claim 1, wherein the compression is varied in said webcam in response to said tracked aspect.

17. The apparatus of claim 8, wherein the frame rate of the webcam is varied in said webcam in response to said tracked aspect.

18. The apparatus of claim 8, wherein the compression is varied in said webcam in response to said tracked aspect.

* * * * *